April 3, 1934.　　　　T. J. GLOVER　　　　1,953,677
APPARATUS FOR EXTERMINATING THE GROUND MOLE
Filed July 10, 1930　　　3 Sheets-Sheet 1

INVENTOR
Truman J. Glover

April 3, 1934.  T. J. GLOVER  1,953,677
APPARATUS FOR EXTERMINATING THE GROUND MOLE
Filed July 10, 1930  3 Sheets-Sheet 2

INVENTOR
Truman J. Glover

April 3, 1934.  T. J. GLOVER  1,953,677
APPARATUS FOR EXTERMINATING THE GROUND MOLE
Filed July 10, 1930   3 Sheets-Sheet 3

INVENTOR
Truman J. Glover

Patented Apr. 3, 1934

1,953,677

UNITED STATES PATENT OFFICE 1,953,677

APPARATUS FOR EXTERMINATING THE GROUND MOLE

Truman J. Glover, Portland, Oreg.

Application July 10, 1930, Serial No. 468,187

7 Claims. (Cl. 43—124)

It has been discovered that the ground mole, as well as some other burrowing animals are distressed and repelled by a certain character of discordant vibrations which may be caused to occur in the soil, resulting in their burrowing to the surface of the soil and retreating as rapidly as possible from the neighborhood of the origin of the vibrations. My invention consists in placing in the soil or on the surface of the soil, mechanism adapted for producing these repellent vibrations and communicating them to the soil, in which they travel considerable distances, and also for capturing the animals during their attempted escape.

Figure 1:
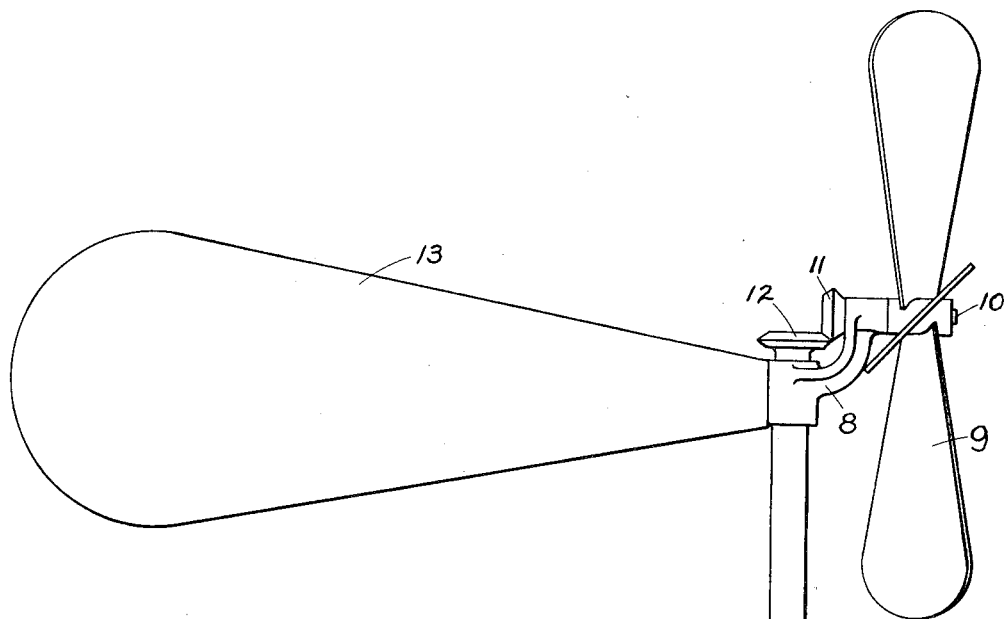
Figure 2:
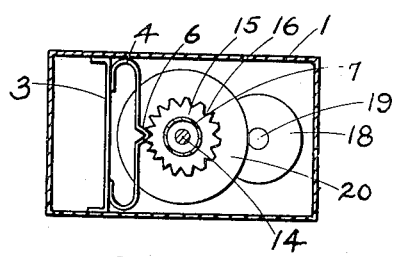
Figure 3:
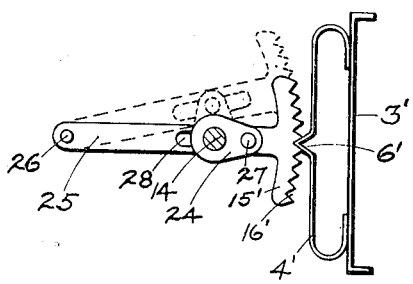
Figure 5:
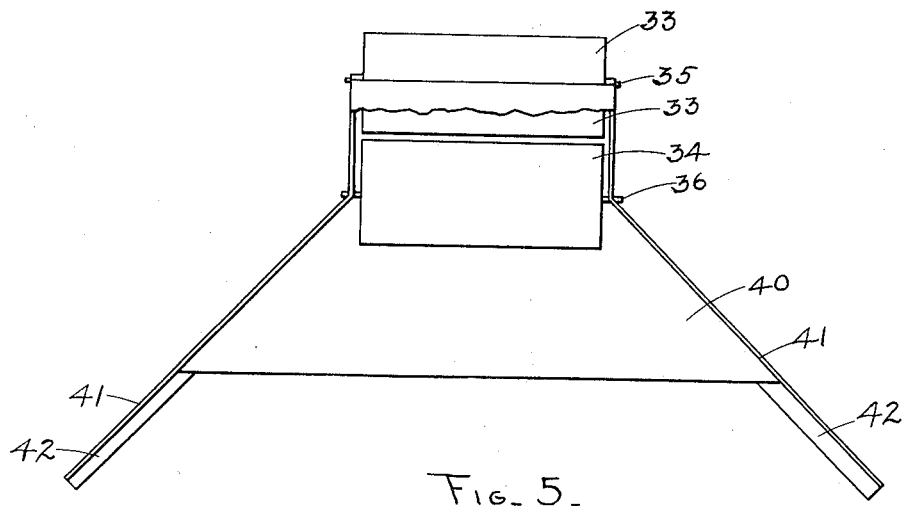
Figure 4:
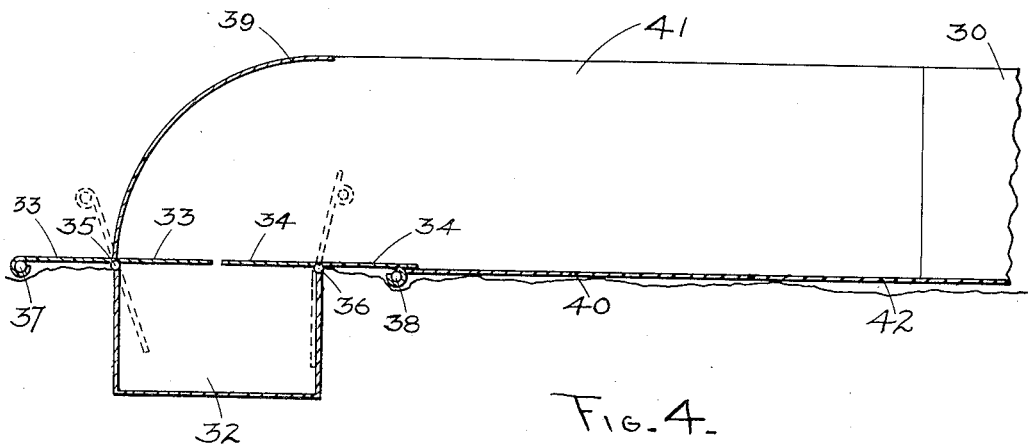
Figure 6:
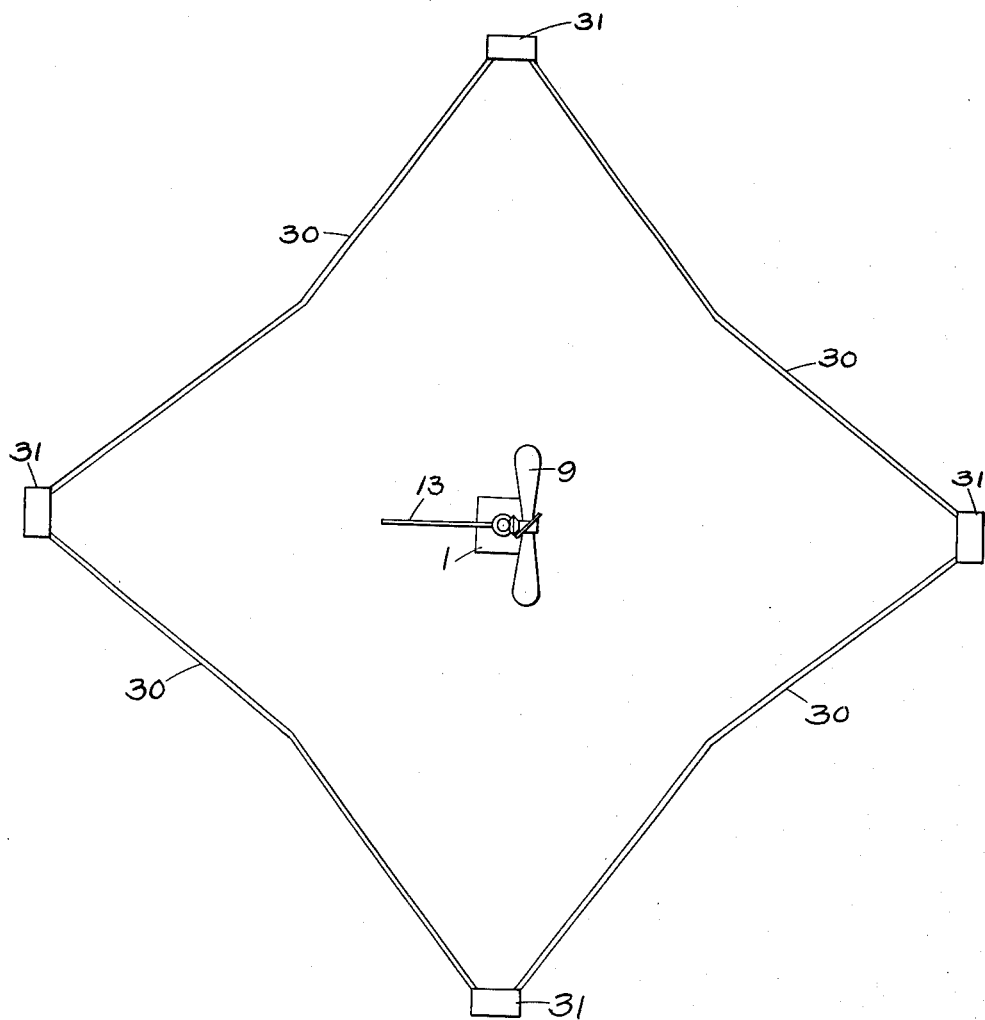

Referring to the drawings, Figure 1 is a side elevation, partly in section, of the vibration producing mechanism, Figure 2 is a top plan view of the same with upper parts removed, Figure 3 is a top plan view similar to Figure 2 showing a modified form, Figure 4 is a longitudinal sectional view showing the trapping mechanism, Figure 5 is a top plan view of the trapping mechanism on a reduced scale, and Figure 6 is a top plan view showing the entire apparatus in position for operation.

The numeral 1 indicates a casing, preferably composed of metal, adapted to be buried in the soil 2. Within the casing 1 and rigidly secured thereto is a sounding board 3 to which is secured spring members 4, 5, each provided with a V-shaped extension or pawl 6.

Secured to the top surface of the casing 1 is a tube 7, extending upward in a vertical direction, on the upper end of which is pivoted a bearing block 8. A windmill 9 is secured to one end of a shaft 10 which is journaled in the block 8. A bevel gear 11 is secured to the other end of the shaft 10 and is adapted to rotate a companion gear 12 supported on the upper horizontal surface of the block 8. A vane 13 serves to maintain the mill 9 in position facing the wind. A shaft 14, on the upper end of which is secured the gear 12, passes downward thru the tube 7 and supports at its lower end a cylindrical disk or ratchet 15. The ratchet 15 is provided with notches 16 in its peripheral surface and is so positioned that the extension 6 in spring 4 may rest in one of its notches.

As the windmill 9 is rotated by the wind, the gear 11, co-operating with gear 12, rotates the shaft 14 and ratchet 15, thus causing the extension 6 to be lifted from one of the notches 16 and to drop into the adjacent notch and to continue this operation from notch to notch, thus causing a violent discordant vibration of the sounding board 3, which vibration is communicated to the casing 1 and to the soil 2, thru which it spreads in all directions. The casing 1, in addition to furnishing means for supporting the various parts, functions as a sounding board and because of its contact with the soil the vibration is communicated to the soil. Its function is analogous to that of a violin case, whereby the vibrations of the springs are communicated to the case, which, in turn, is enabled to communicate the vibration to the air with greater amplitude and intensity. The casing 1 is essential for securing, in the greatest degree, the required results.

A modified form of mechanism shown in Figure 3 may be employed, in which a crank or lever arm 24 is secured to the lower end of the shaft 14 and within the casing 1. A ratchet lever 25 is pivoted at 26 to the casing 1 and is fitted at its opposite end with a segmental disk 15' provided with ratchet notches 16' in its edge. A pin 27 in the lever arm 24 extends downward into a slot 28 in lever 25. As the shaft 14 is rotated, the pin 27 sliding back and forth in the slot 28 causes the lever 25 to oscillate on the pivot 26, occupying a position as shown by dotted lines and an opposite position thereto at each revolution of the shaft 14. The pin 27 resting in the slot 28, being at a greater distance from the pivot 26 in the position shown in Figure 3 than when in opposite position at the other end of the slot 28, the speed of travel of the free end of lever 25 is thus caused to vary and the rate of vibration likewise is varied and for a purpose later set forth. The spring 4' and V-shaped extension 6' secured to the sounding board 3' produce a similar vibration when the shaft 14 is rotated.

It will be observed that by varying the relative diameters of the gears 11 and 12 a like relative variation of speed of rotation between the windmill and ratchet may be secured. By making the gear 11 small and the gear 12 larger, a smaller windmill may be employed, or greater power may be secured for operating the ratchet 15 at a slower speed. In regions where high wind velocities are prevalent this change of relative sizes of gears secures a more desirable and effective rate of vibration in the soil, and provides means for controlling the rate of vibration. It is observed that a rate of vibration within certain limits is more repellent to the animals than other rates of vibration of a higher or lower pitch and that the more effective repellent vibrations need not necessarily be continuous.

Inasmuch as there are periods when the wind is not blowing and there are sheltered positions adjacent to buildings or trees and in depressions in the land surface where the wind may not blow, I provide mechanism for the optional means of electrical operation. On the floor of the casing 1 is secured a small electric motor 18 carrying on its shaft a gear pinion 19 meshing with a spur gear 20 rotatably supported from the bearing block 21 and adapted to rotate a cylindrical ratchet 22, which, like the ratchet 15, is provided with notches on its periphery adapted to co-operate with the extension 6 on spring 5 and produce a similar vibration in the sounding board 3 and other parts.

The structures shown represent only one of several electrically operated methods that may be employed for producing the desired vibration. Mechanism similar to the electrical buzzer and the automobile horn, both in common use, may be employed for producing the desired vibrations, without departing from the spirit of my invention.

The vibration-producing mechanism being adapted for operation while buried beneath the surface of the soil, not only secures maximum facility for communicating the vibrations to the soil, but permits of the operation of the machine without disturbing human residents of the neighborhood, which it would inevitably do if operated on or above the ground surface.

In order to prevent the escape of the moles into contiguous territory after they are driven from beneath the surface of the soil by the vibrations of the machine, fences 30 are so placed as to completely surround the vibration-producing mechanism, as shown in Figure 6. These fences have their lower edges bent inward to prevent the animals from burrowing under them and to secure stability of position. At convenient intervals in the fences are inserted traps 31, which consist of a casing 32, Fig. 4, preferably rectangular in form, which may be sunk into the ground with its upper surface flush with the soil surface. Swinging doors 33, 34, disposed horizontally and pivoted to the casing 32 at 35, 36 are provided with counterpoise weights 37, 38 which cause them to normally rest in horizontal position. A guard plate 39, preferably of curved form, is erected above the pivot 35 and secured to the casing 32. A floor 40 extending horizontally a short distance inside the casing 32 at the soil surface and wings 41 provided with guard flanges 42 extending horizontally inward from the lower edge of the wings 41 are provided for preventing the animals from burrowing beneath the structure.

The animal, traveling along the fences 30 in its endeavor to escape, passes over the plate 40 onto the swinging doors 33, 34 and its progress is arrested by the guard plate 39. Its weight overcomes the resistance of the weights 37, 38 and it drops into the interior of the casing 32. The weights 37, 38 return the doors 33, 34 to horizontal position and the animal is thus prevented from escaping. By these means all the moles, and in some instances other animals, in the soil inclosed by the fences, are driven to the surface and caused to pass into the traps there to be confined until liberated.

I claim:

1. A casing, vibration producing mechanism incorporated in the casing, and means for operating the vibration-producing mechanism, for the purpose specified.

2. A casing, vibration-producing mechanism incorporated in the casing, a windmill, and means connecting the windmill and the vibration-producing mechanism so constructed as to operate the latter, for the purpose specified.

3. A casing, a ratchet incorporated in the casing, a pawl co-operating with the ratchet, which pawl is so constructed as to yield when the teeth of the ratchet strike it, as the ratchet is rotated on its axis or center, and means for producing relative movement between the ratchet and the pawl, for the purpose specified.

4. A casing, a ratchet incorporated in the casing, a spring member co-operating with the ratchet, and means for producing relative movement between the ratchet and the spring member, for the purpose specified.

5. A ratchet, a spring member co-operating with the ratchet, a sounding board, and means for operating the ratchet, for the purpose specified.

6. A sounding board, a spring member co-operating with the sounding board, a ratchet co-operating with the spring member, a windmill and means connecting the windmill and the ratchet for operating the latter, all for the purpose specified.

7. A casing, a standard extending from the casing, a windmill supported by the standard, a ratchet, gearing connecting the windmill and the ratchet, a spring pawl co-operating with the ratchet, and a sounding board, for the purpose specified.

TRUMAN J. GLOVER.